United States Patent
Tutikawa

(10) Patent No.: US 7,412,261 B2
(45) Date of Patent: Aug. 12, 2008

(54) PORTABLE TELEPHONE

(75) Inventor: Yoshiji Tutikawa, Osaka (JP)

(73) Assignee: Daiyasu Metal Industry Co., Ltd., Osaka (JP)

( * ) Notice: Subject to any disclaimer, the term of this patent is extended or adjusted under 35 U.S.C. 154(b) by 15 days.

(21) Appl. No.: 10/398,591

(22) PCT Filed: Oct. 1, 2001

(86) PCT No.: PCT/JP01/08662

§ 371 (c)(1), (2), (4) Date: Sep. 29, 2003

(87) PCT Pub. No.: WO02/30091

PCT Pub. Date: Apr. 11, 2002

(65) Prior Publication Data

US 2004/0057577 A1 Mar. 25, 2004

(30) Foreign Application Priority Data

Oct. 5, 2000 (JP) .............................. 2000-305613

(51) Int. Cl.
*H04B 1/38* (2006.01)

(52) U.S. Cl. .................... 455/566; 455/556.2; 361/681; 361/682; 361/683

(58) Field of Classification Search ................. 455/566, 455/556.2; 361/681–683
See application file for complete search history.

(56) References Cited

U.S. PATENT DOCUMENTS 5,534,888 A * 7/1996 Lebby et al. ................ 345/672
5,901,222 A * 5/1999 Macor ................... 379/433.04
5,905,964 A * 5/1999 Sudo .......................... 455/566
6,047,196 A * 4/2000 Makela et al. ............ 455/556.1
6,144,358 A * 11/2000 Narayanaswamy et al. . 345/102
6,233,469 B1 * 5/2001 Watanabe ................ 455/575.1
6,269,256 B1 * 7/2001 Nakamura .................. 455/567
6,297,945 B1 * 10/2001 Yamamoto .................. 361/681
6,302,612 B1 * 10/2001 Fowler et al. .................. 403/76
6,327,482 B1 * 12/2001 Miyashita .................... 455/566
6,640,113 B1 * 10/2003 Shim et al. .................. 455/566
6,643,124 B1 * 11/2003 Wilk ........................... 361/681
2002/0021258 A1 * 2/2002 Koenig ........................ 345/1.1

* cited by examiner

*Primary Examiner*—Matthew Anderson
*Assistant Examiner*—Dominic E Rego
(74) *Attorney, Agent, or Firm*—Wood, Phillips, Katz, Clark & Mortimer

(57) ABSTRACT

A portable telephone has a telephone body (1) with a first liquid crystal display (2) formed on the frontal face of the telephone body, a swingable plate (4) connected by a hinge (3) to one of lateral edges of said body (1), and a second liquid crystal display (5) formed in and disposed on the swingable plate (4). The second crystal display (5) will be at its exposed position to face backwards when the plate (4) is at its closed position folded back in a close contact with the rear face of the telephone body (1), and the swingable plate (4) can pivot forwards so that the second display (5) faces the same direction as the first display (2). The portable telephone of the invention can be used as it is to serve as an ordinary portable telephone, with its main liquid crystal display (2), but its swingable plate folded back on the back of its body may be put into a reversed position so that its supplementary display cooperates with the main display to form an enlarged area for displaying any information of a large volume such as obtained through INTERNET or the like.

5 Claims, 5 Drawing Sheets

PORTABLE TELEPHONE

BACKGROUND OF THE INVENTION

1. Field of the Invention

The present invention relates to a portable telephone having a liquid crystal display device installed therein to display characters and/or images.

2. Background Art

Recently, portable telephones have been made smaller and smaller in size to be more convenient to carry. On the other hand, supplementary functions have been added to the normal ones of each portable telephone serving as a terminal output equipment for receiving information through INTERNET and/or from the like data source. Thus, larger liquid crystal devices are required to indicate thereon the information or data of such a larger volume. One of the proposals that has been made to meet this requirement is disclosed in the Japanese Patent Early Publication Gazette No. 11-249596. According to this proposal, a lid is attached to the first or ordinary liquid crystal display of a telephone body so as to be opened and closed relative thereto. In this case, a second liquid crystal display is formed in the inner face of such a lid such that when the lid is opened during use of this telephone the first and second display swill serve as portions of an integrated multi-display device.

It is however to be noted that such a prior proposal is not necessarily convenient to use. This is because the lid remains closed to hide the first display built in the telephone body, unless or until intentionally opened to allow an operator or user to look at the display in normal use of the portable telephone. It also is a problem that such an additional second liquid crystal display is not indispensable but rather useless to normal and ordinary operation of this telephone.

A primary object of the present invention made to resolve the drawbacks of the prior art is therefore to provide a portable telephone with a second liquid crystal display in addition to a first or ordinary liquid crystal display built in the telephone, such that the first display can play its normal role as it is and as usual. The second display that has been folded back to rear of the telephone body has to be reversed forwards so that the first and second displays form an extended display for indicating the information of a large capacity received through INTERNET or the like.

DISCLOSURE OF THE INVENTION

In order to achieve this object, the present invention employs the following technical features. A portable telephone provided herein has a telephone body having a first liquid crystal display formed on the frontal face of the telephone body, a swingable plate connected by a hinge to one of the lateral edges of said body, and a second liquid crystal display formed in and disposed on the swingable plate. The second crystal display will be at its exposed position to face backwards when the plate is in its closed position folded back in a close contact with the rear face of the telephone body, and the swingable plate is capable of pivoting forwards so that the second display faces the same direction as the first display.

Alternatively, a portable telephone provided herein may have, as shown in FIGS. 4 and 5, a telephone body having a first liquid crystal display formed on the frontal face of the telephone body, swingable plates respectively connected by hinges to lateral edges of said body, and a second liquid crystal display and a third liquid crystal display that are formed in and disposed on the respective swingable plates. The second and third displays will be at their exposed position to face backwards when the plates are at their closed position folded back closely to the rear face of the telephone body, and the swingable plates are capable of pivoting forwards so that the second and third displays do face the same direction as the first display.

As seen in FIG. 3, the second or third liquid crystal display may extend substantially over the full height of the telephone body.

DETAILED DESCRIPTION OF THE INVENTION

Figure 1:
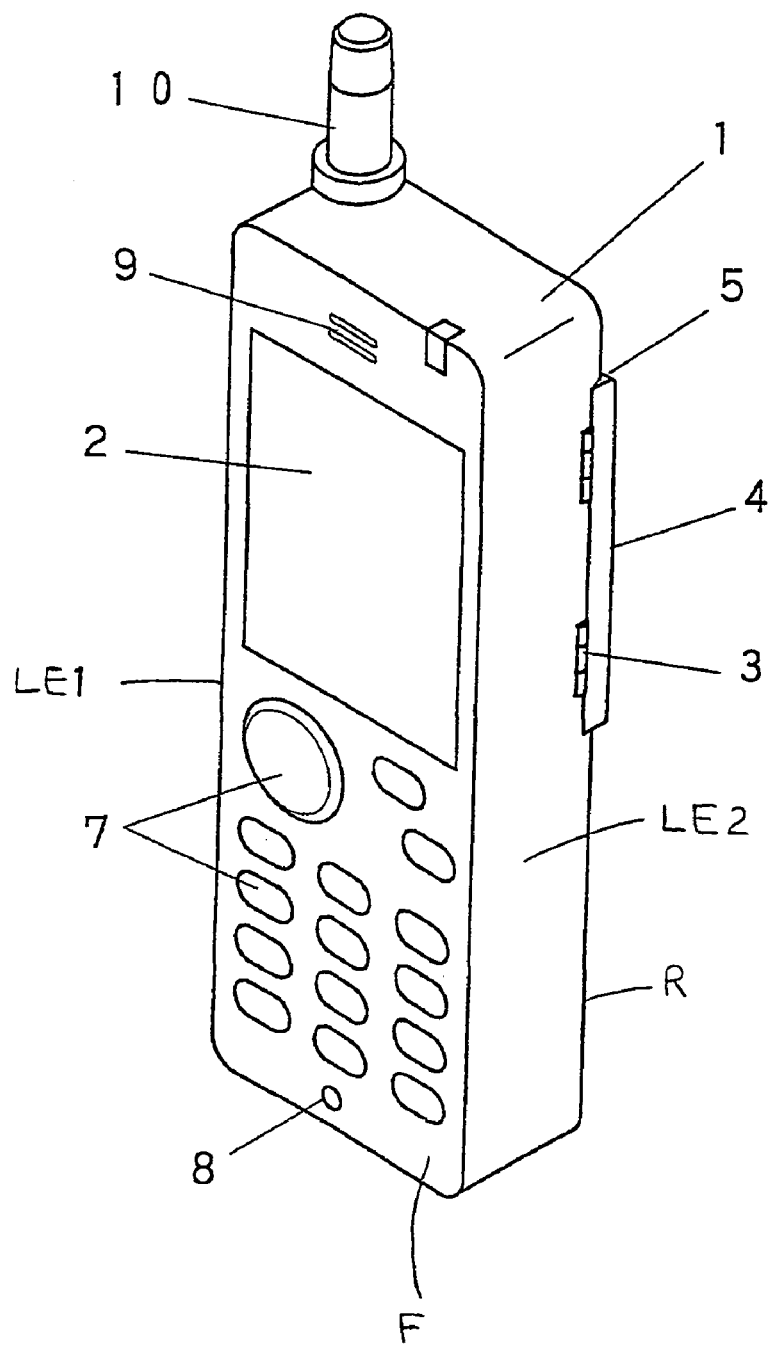
FIG. 1 is a perspective view of a portable telephone provided in a first embodiment of the present invention.
Figure 2:
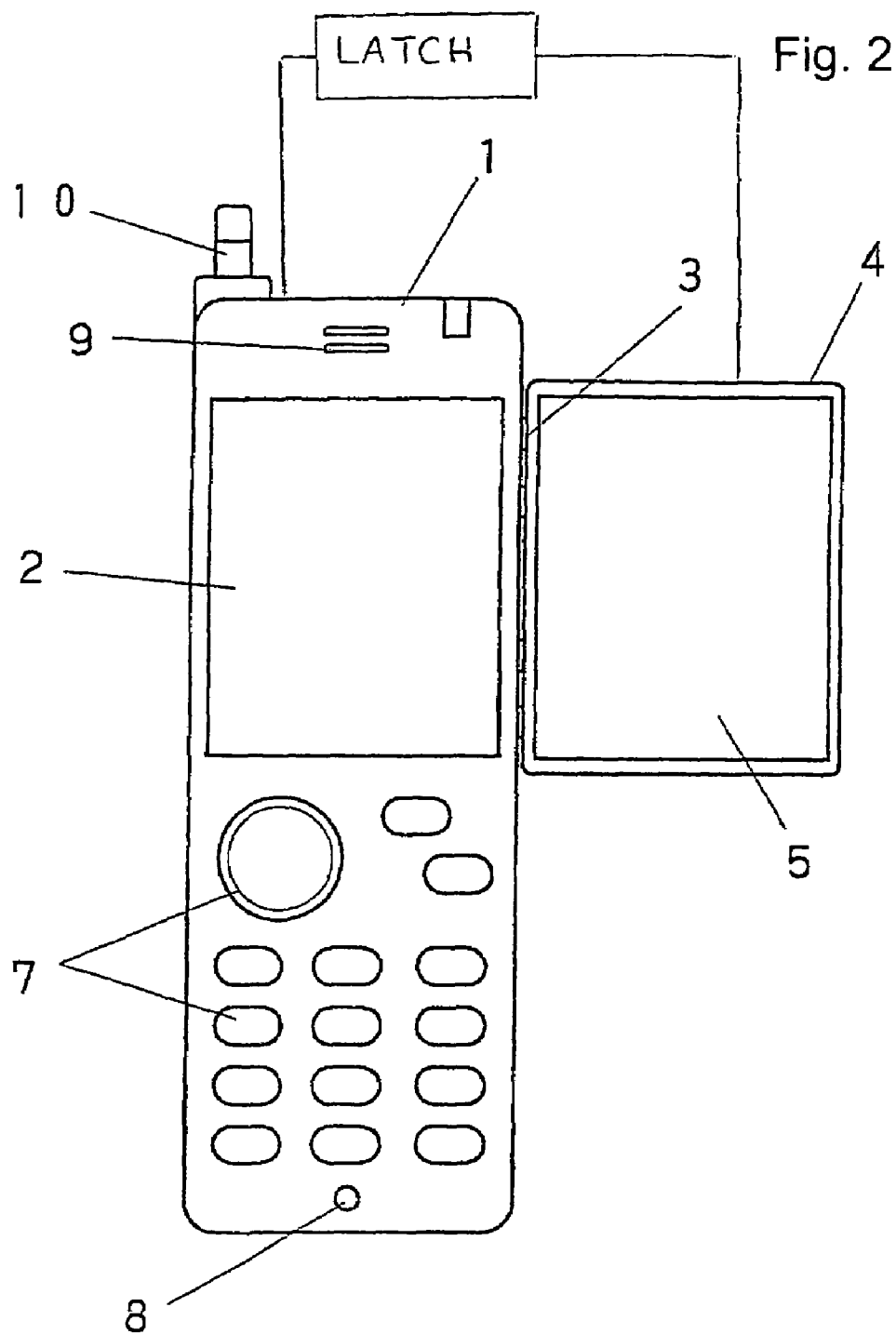
FIG. 2 is a front elevation of the telephone shown in FIG. 1 and in such a state that its swingable plate has pivoted to its frontal position.

Now, structural features of the present invention will be described referring to embodiments shown in the drawings, wherein FIGS. 1 and 2 illustrate a portable telephone provided in a first embodiment with a body generally denoted by the reference numeral 1. The body 1 has a fixed shape with a frontal face F, a rear face R, and spaced lateral edges LE1. LE2. Similarly to the ordinary and conventional portable telephones, the telephone body 1 has herein a first liquid crystal display 2, a plurality of manipulative buttons 7, a microphone 8, a speaker 9 and an antenna 10 that is disposed on top of said body. The manipulative buttons 7, microphone 8, and speaker 9 are provided at the frontal face F.

A hinge 3 secured to one of lateral edges LE2 of the telephone body 1 connects thereto the swingable plate 4, permitting it to be folded back in contact with the back/rear face R of said body 1. At such a closed position of the plate 4 held in a close and direct contact with the back of telephone body 1, a second liquid crystal display 5 installed in the plate 4 will be exposed to face rearwards in the outer surface thereof. The swingable plate 4 can swivel to bring the second display 5 into a reversed/open position facing in the same direction as the first one 2. In this position, the manipulative buttons 7, microphone 8, and speaker 9 are exposed.

When using the portable telephone of the invention as an ordinary telephone, an operator or user may leave the swingable plate 4 directly contacting the back of telephone body 1. The first liquid crystal display 2 at such a position of this telephone body will work to indicate a telephone number or the like characters possibly together with any symbols or the like figures. If the first display 2 has to show thereon any information of large volume such as those received through INTERNET or the like data source, then the swingable plate 4 that has been folded back on the said back of telephone body will be operated to take a reversed position as illustrated in FIG. 2. At this position, the second liquid crystal display 5 cooperates with the first one 2 in the telephone body 1 to form an extended image area wide enough to match an integrity of information elements of a large capacity, including the characters and figures.

Preferably, a simple latch or like engagement mechanism may be incorporated to act between the body 1 and plate 4 to stabilize both the folded and extended positions of the swingable plate 4, whether in or out of contact with the back of the telephone body 1.

Figure 3:
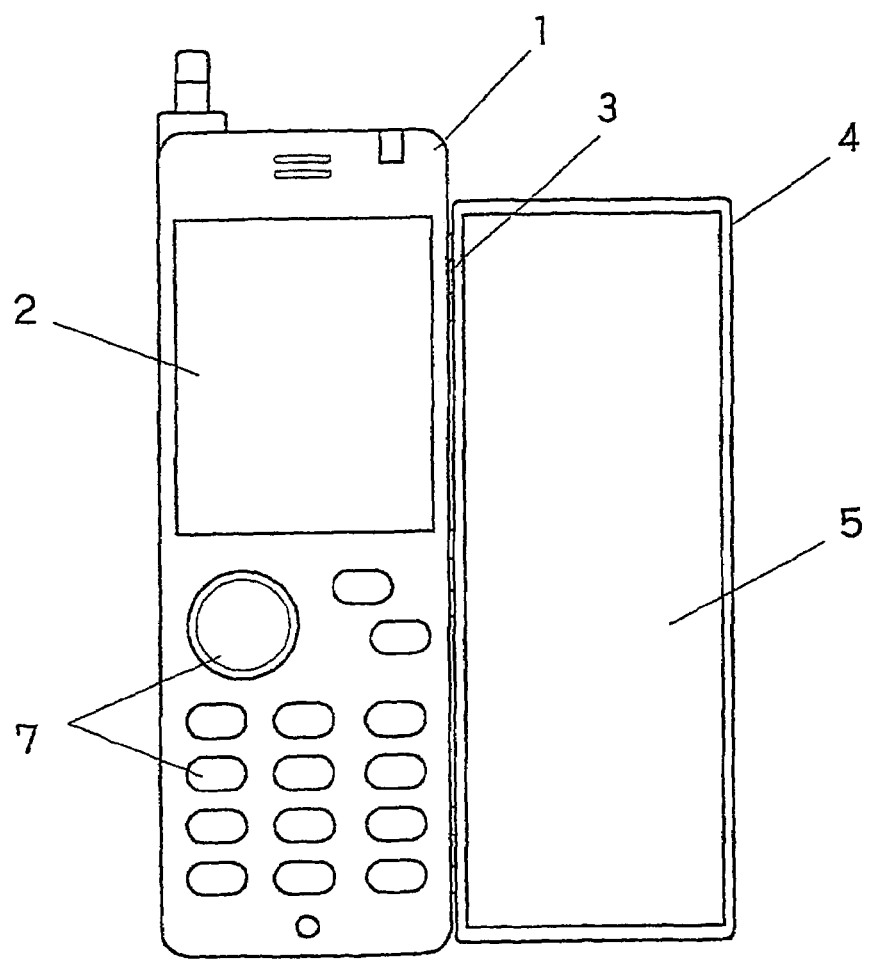
FIG. 3 is a front elevation similar to FIG. 2 but showing the portable telephone in another embodiment.

It may be possible to form the second display 5 to extend substantially over the full height of the telephone body 1, as seen in FIG. 3.

Figure 4:
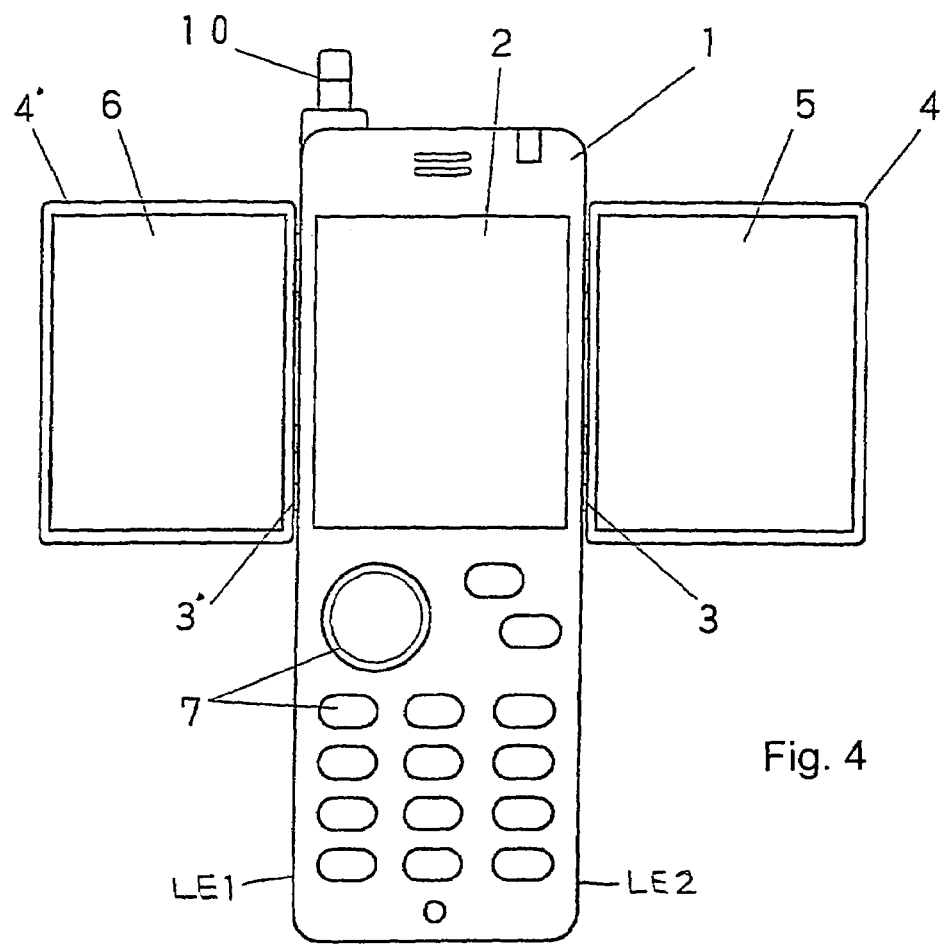
FIG. 4 is a front elevation similar to FIG. 2 but showing the portable telephone in still another embodiment.
Figure 5:
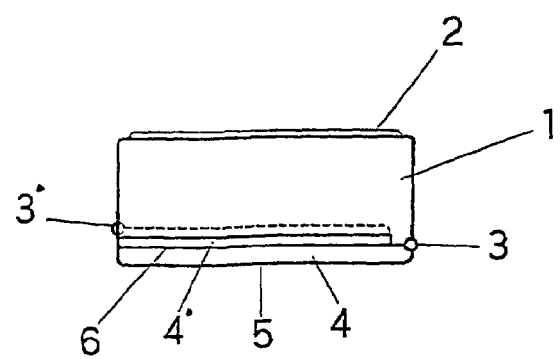
FIG. 5 is a bottom view of the telephone shown in FIG. 4 and in such a state that its swingable plate has been folded back.

In still another embodiment of the invention shown in FIGS. 4 and 5, both the lateral edges LE1, LE2 adjacent the rear of said body 1 have hinges 3 and 3' formed integral therewith. These hinges 3 and 3' connect two swingable plates 4 and 4' to the telephone body 1 so as to permit them to be folded into contact, one with the other and with the back of said body. At such a closed position of plates 4 and 4' held in contact with the back of telephone body 1, the second liquid crystal display 5 and a third one 6 installed in these plates will be exposed to face rearwards in the outer surfaces thereof. Similarly to the embodiment described above, the swingable plate 4 and 4' can also swivel to bring the second and third displays 5 and 6 into a reversed position facing the same direction in which the first one 2 does face. At this position, the second and third liquid crystal displays 5 and 6 cooperate with the first one 2 in the telephone body 1 in such a fashion that a much bigger extended image area will be provided.

Figure 6:
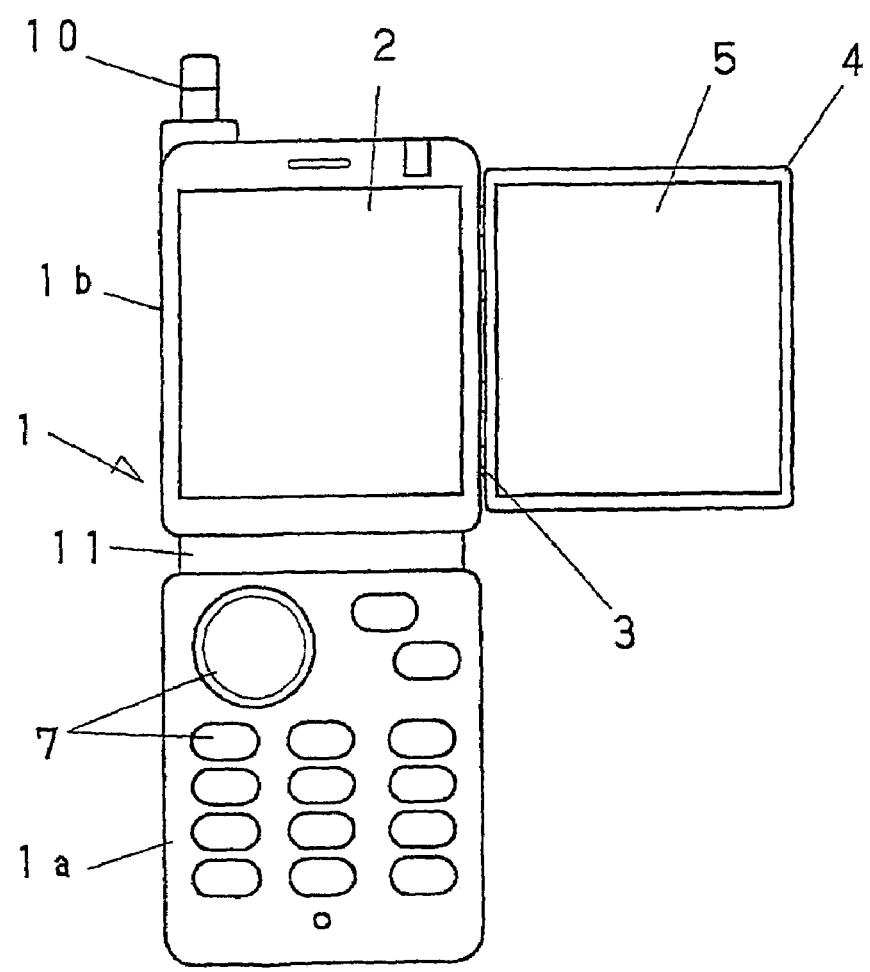
FIG. 6 is a front elevation similar to FIG. 2 but showing the portable telephone in a further embodiment.

A twice-folded portable telephone may also be provided in a further embodiment as shown in FIG. 6. In this case, a main part 1*a* with manipulative buttons 7 and a panel part 1*b* with the liquid crystal display 2 constitute a telephone body 1. A transverse hinge 11 enables the main part 1*a* to be folded onto the panel part 1*b*, and similarly to the first embodiment a swingable plate 4 with the second display 5 will pivot around the hinge 3 so as to normally contact the back of the panel part 1*b* of said body 1. Alternatively, this plate 4 may be secured to the main part 1*a* of said telephone body, likewise contacting the back of this part 1*a* normally.

Some representative embodiments are described above, although they may be modified in varied manners insofar as any similar constituent elements or parts are employed to achieve the object of invention and to afford the same effects and advantages as noted below.

In summary, the portable telephone of the invention can be used as it is to serve as an ordinary portable telephone, with its main liquid crystal display giving images of a telephone number or the like characters as well as figurative images. Its swingable plate folded back on the back of its body may be put into a reversed position so that its supplementary display cooperates with the main display to form an advantageous enlarged area for simultaneously displaying any information of a large volume.

The invention claimed is:

1. A portable telephone comprising: a telephone body with a fixed shape having a frontal face, a rear face and spaced lateral edges, the telephone body comprising manipulative buttons, a speaker, a microphone, and a first liquid crystal display formed on the frontal face of the telephone body on which characters and symbols related to telephone function can be displayed, a swingable plate connected by a hinge to one of the lateral edges of said body, and a second liquid crystal display formed in and disposed on the swingable plate, wherein the second crystal display will be in an exposed position to face backwards when the plate is in a closed position folded back in a close contact with the rear face of the telephone body, and the swingable plate is capable of pivoting forwards from the closed position to an open position so that the second display faces the same direction as the first display, the manipulative buttons, speaker, and microphone exposed at the frontal face with the swingable plate in each of the closed and open positions, the first and second liquid crystal displays each capable of displaying thereon data from a data source such as the INTERNET, the first and second liquid cystal displays capable of cooperatively defining an extended image area to display data with the swingable plate in its open position.

2. The portable telephone according to claim 1 wherein there is a latch that acts between the body and swingable plate to stabilize the swingable plate in at least one of the open and closed positions.

3. The portable telephone according to claim 1 wherein one of the lateral edges has a height and the second crystal display extends over substantially the full height of the one of the lateral edges.

4. The portable telephone according to claim 1 further comprising a cover plate that is connected to the swingable plate by a hinge.

5. A portable telephone with capability to display information from the INTERNET, and comprising:

an elongate telephone body with a frontal face, two opposed lateral edges and two opposed ends and a rear face, and having a set of buttons on a lower part of the frontal face and a first liquid crystal display formed on an upper part of the frontal face of the telephone body on which characters and symbols related to telephone function can be displayed, with a transverse hinge between the upper part and the lower part, a first swingable plate connected by a hinge to one of the lateral edges of said body, and a second liquid crystal display formed in and disposed on the swingable plate, wherein the second crystal display will be at a first exposed position and facing backwards when the plate is at its closed position folded back in a close contact with the rear face of the telephone body, and the swingable plate is capable of pivoting forwards so that the second display in a second exposed position faces the same forward direction as the first display and is adapted to cooperate with the first display to form an extended display, the first and second liquid crystal displays each capable of displaying thereon data from a data source such as the INTERNET, the first and second liquid crystal displays capable of cooperatively defining an extended image area to display data with the swingable plate in its open position.

* * * * *